United States Patent [19]

Hodgetts

[11] Patent Number: 4,860,965
[45] Date of Patent: Aug. 29, 1989

[54] INTERNALLY MOUNTED DRIVE MECHANISM FOR A BELT-WINDING DRUM

[75] Inventor: Graham L. Hodgetts, Mars, Pa.

[73] Assignee: Rolflor Industries, Evans City, Pa.

[21] Appl. No.: 130,999

[22] Filed: Dec. 10, 1987

Related U.S. Application Data

[63] Continuation-in-part of Ser. No. 24,719, Mar. 11, 1987, Pat. No. 4,760,971.

[51] Int. Cl.$^4$ ............................................... B66D 1/14
[52] U.S. Cl. .............................. 242/67.1 R; 254/342; 254/361; 254/362
[58] Field of Search ............... 254/342, 344, 362, 361; 242/67.1 R, 55

[56] References Cited

U.S. PATENT DOCUMENTS

| | | | |
|---|---|---|---|
| 1,323,245 | 12/1919 | Borkes | 254/344 |
| 2,066,779 | 1/1937 | Himmel | 254/342 X |
| 2,540,099 | 2/1951 | Christian | 254/342 X |
| 4,310,146 | 1/1982 | Geppert | 254/342 |
| 4,760,971 | 8/1988 | Hodgetts | 254/342 X |

Primary Examiner—Daniel P. Stodola
Assistant Examiner—Katherine Matecki
Attorney, Agent, or Firm—Fleit, Jacobson, Cohn, Price, Holman & Stern

[57] ABSTRACT

An internally mounted rotary drum drive mechanism optimizes the space within a drum by utilizing a rim-mounted, motor-driven rotating gearbox for applying torque to the drum through a ring-type mounting flange releasably secured between the gearbox and an internal wall of the drum. Radial screws extend through oversize apertures in the wall of the drum for releasably attaching the gearbox to the drum. A motor mounting flange locates the motor in driving position adjacent the gearbox. The motor mounting flange is supported on a reactor tube extending out of the drum and the reactor tube is supported by an external anchor plate. The drive mechanism may be situated at one end of the drum, and a bearing assembly of similar character to the drive mechanism, but using a rim-mounted dummy gearbox, may be provided internally at the other end of the drum.

15 Claims, 2 Drawing Sheets

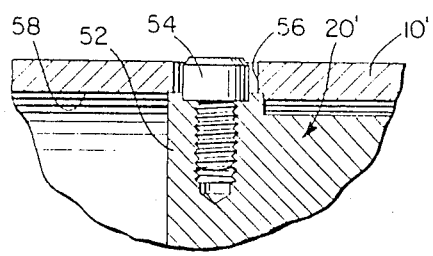
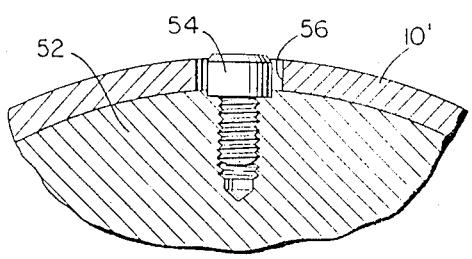
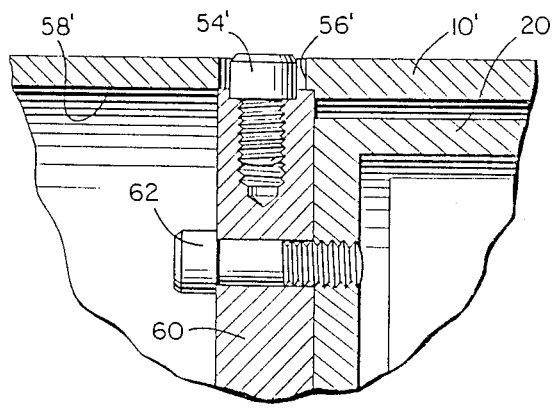
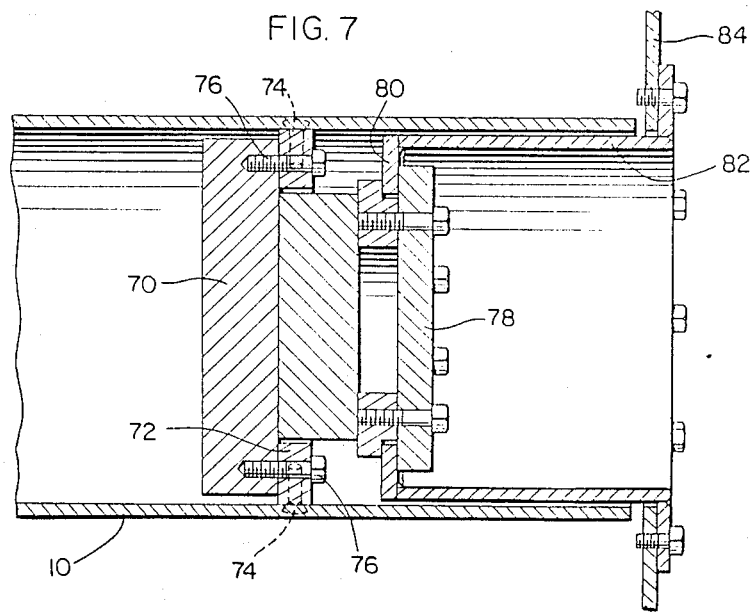

INTERNALLY MOUNTED DRIVE MECHANISM FOR A BELT-WINDING DRUM7

CROSS REFERENCE TO RELATED APPLICATIONS

This application is a continuation-in-part application of Ser. No. 024,719, filed Mar. 11, 1987, now U.S. Pat. No. 4,760,971, issued Aug. 2, 1988, and the contents of which is expressly incorporated herein by reference.

BACKGROUND OF THE INVENTION

This invention relates to drive systems for rotary drums or rolls used, for example, in driving or winding conveyor belts, flexible floors and the like.

A common requirement in the winding or driving of conveyor belts, flexible floors, and the like, is to provide a drive mechanism which is mounted internally of a drum on which the belt or floor is wound. This requirement is particularly relevant where a conveyor or flexible floor is to be used in a confined space which precludes the use of a drum drive mechanism that projects to any appreciable extent from the end of a drum. For example, in trucks having load beds incorporating a driven loading/unloading conveyor, it is desirable for the conveyor (and also its driving drum) to extend substantially across the entire width of a truck body. In this arrangement, it is necessary for the drum drive to be housed internally within the drum, since Federal requirements preclude the use of a drive mechanism which might project from the side of a truck.

Internally mounted rotary drum drive systems are known, such systems commonly comprising a motor and gearbox assembly accommodated within a cavity within the drum. In one known system, for example, the gearbox housing itself is rotated and forms a drive connection to the drum through a mounting flange permanently attached to the internal circumference of the drum, and to which the gearbox housing is secured by a rim-mounting. With this system, however, to allow removal of the gearbox, the drum diameter may need to be larger than would otherwise be necessary. In another known system, the gearbox has an output shaft providing a rotary drive connection with the drum through an internal drum flange. A stationary gearbox housing is mounted on a further flange which is itself attached to a stationary mounting tube. The tube has an internal diameter larger than that of the gearbox and an external diameter smaller than the internal diameter of the drum. This arrangement requires the internal diameter of the drum to be large enough to accommodate the mounting tube and may also require the use of separate drum bearings, since the configuration requires the gearbox output shaft to be a loose fit in the drum drive flange for removal and replacement purposes.

SUMMARY OF THE INVENTION

It is an object of the invention to provide a novel internally mountable rotary drum drive mechanism which can be readily removed from and replaced within a drum of generally small diameter relative to the size of the drive mechanism thereby minimizing the overall weight of the drum and the torque required to drive same.

A more particular object of the invention is to provide a drive mechanism as aforesaid which uses a rim-mounted rotary gearbox housing for imparting drive to the drum, eliminating the need for a shaft output gearbox and associated mounting tube, and enabling the gearbox bearings to provide support for the drum without total dependence on separate drum bearings.

In fulfillment of the above and other objects, the invention accordingly provides, in one of its aspects, an internally mountable drive mechanism for a rotary drum having an internal cylindrical cavity for accommodating the drive mechanism with a peripheral wall and an access opening at one end of the drum, the drive mechanism including a gearbox having a housing adapted to fit the cavity, ring-like mounting flange means, which may be in the form of a multi-part split-flange, the mounting flange means conforming in outside diameter to the diameter of said wall, first fastener means, preferably circumferentially spaced axially extending screws, for releasably attaching the flange means to a surface of the gearbox housing facing the access opening, second fastener means, preferably circumferentially spaced screws extending radially through the drum, for releasably attaching the flange means to the internal wall of the cavity in predetermined axial position, a motor for driving the gearbox in a manner rotating the gearbox housing, and a motor mounting assembly for mounting the motor in drive position in said cavity adjacent one end of the gearbox which faces the access opening. Preferably, the gearbox mounting assembly may comprise a mounting flange for locating the motor adjacent one said end of the gearbox, a reactor tube conforming generally in diameter to the diameter of the cavity, and a length to extend from the motor mounting flange out of the cavity through the access opening, and third fastener means for releasably attaching the reactor tube to the motor mounting flange. Externally of the cavity, adjacent the one end of the drum, the reactor tube may be attached to a stationary ring-like anchor plate or the like.

In accordance with a further important feature of the invention, the motor mounting flange may have an outer diameter substantially conforming to the diameter of the cavity and the periphery of the flange may be notched at a location or locations to be aligned with the first fastener means by suitable rotation of the flange, whereby access is obtained to the first fastener means for tightening and loosening same during assembly and removal of the drive mechanism.

By using a split, multi-part mounting flange (rather than a continuous 360° ring-like flange) for securing the gearbox housing to the inner wall of the drum, securing the flange by radial screws extending through apertures in the drum, and securing the gearbox housing to the flange by circumferentially spaced axial screws, an accurately conforming, tight fitting mounting of the gearbox in the drum can be obtained by suitable tightening of the respective sets of fasteners without the need for internally machining the drum accurately to conform to the outer diameter of the split-flange. Moreover, the provision of the respective sets of fasteners, along with the notches in the motor mounting flange, enables the system readily to be assembled and dismantled from the access end of the drum without having to make the drum diameter substantially larger than that of the gearbox housing. Other advantages of the system are the ability of the gearbox bearings to support the drum and better integration of the gearbox and motor into the drum allowing smaller more compact gearboxes and motors to be used than in equivalent prior art systems.

While the split-flange arrangement has the advantages noted above, it holds the gearbox tightly in the drum in a manner whereby bending stresses in the drum may be transmitted to the gearbox bearings. Accordingly, in a modified arrangement according to the invention, the split-ring type mounting flange is replaced either with a continuous one-piece 360° mounting ring or an integral peripheral flange on the gearbox housing. In either case, the ring or flange is again secured to the inner wall of the drum by radial crews with socket heads which fit in oversize apertures formed in the drum. With this arrangement, it is generally necessary to machine the inner wall of the drum accurately to conform to the outer diameter of the ring or flange, at least to a location immediately beyond the aforesaid apertures. The remainder of the drive mechanism may be substantially the same as for the split-flange embodiment.

With the modified arrangement, assembly may be somewhat simpler than with the split-flange arrangement and bending stresses in the drum are not transmitted to the gearbox bearings.

Additional features and advantages of the invention will become apparent from the ensuing description and claims read in conjunction with the attached drawings.

BRIEF DESCRIPTION OF THE DRAWINGS

FIG. 4 is an enlarged sectional elevational view of a part of a modified drive mechanism according to the invention, FIG. 5 is a view on line 5—5 of FIG. 4, FIG. 6 is a view similar to FIG. 4 showing a further modification, and FIG. 7 is a sectional elevational view of a bearing assembly which may be used at the end of a drum opposite the end in which a drive mechanism according to the preceding figures is used.

DESCRIPTION OF THE PREFERRED EMBODIMENT

Figure 1:
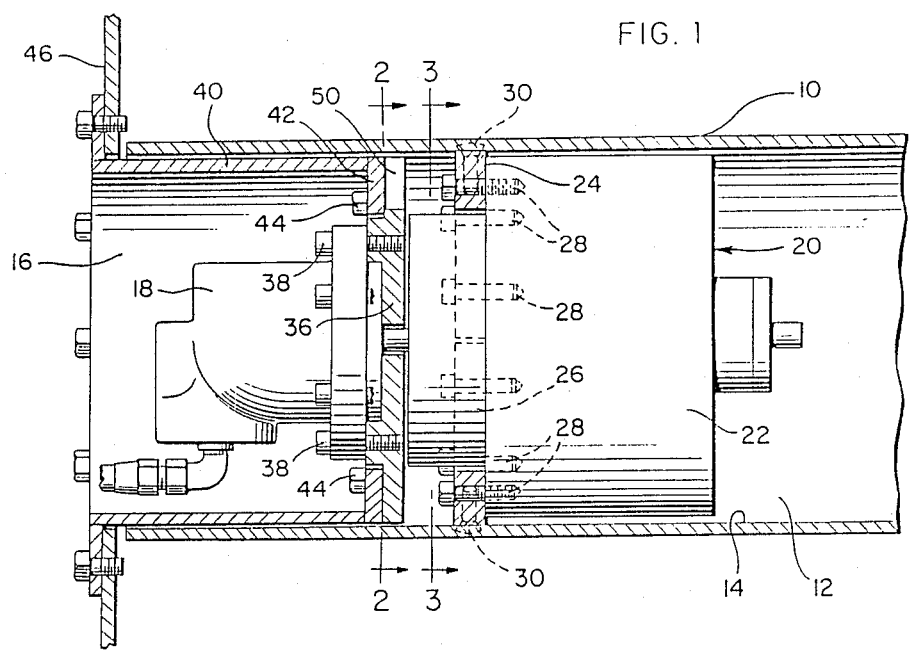
FIG. 1 is a sectional elevational view through a rotary drum for driving or winding a conveyor belt or the like, the drum being equipped with an internally mounted drive mechanism according to the invention.
Figure 2:
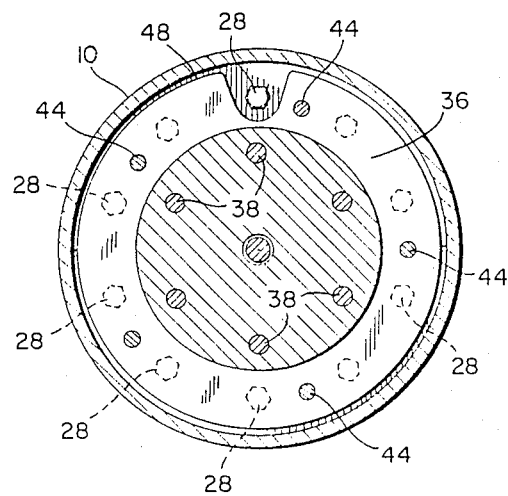
FIG. 2 is a sectional view on line 2—2 of FIG. 1.
Figure 3:
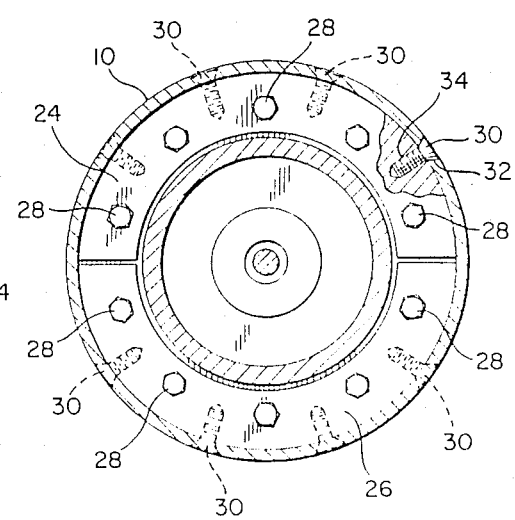
FIG. 3 is a sectional view on line 3—3 of FIG. 1.

Referring initially to FIGS. 1 to 3 of the drawings in detail, there is shown a rotary drum 10 which may, for example, comprise a driving or winding drum for a conveyor belt, flexible floor, or the like, not shown. The drum has an internal cavity 12 with a peripheral wall 14, and an access opening 16 into the cavity at one end of the drum. In order, inter alia, to conserve space, particularly at the one end of the drum, the drum is provided with a rotary drive mechanism in accordance with the invention which is mounted internally of the drum in cavity 12, as will be described, and which includes, inter alia, a drive motor 18 and a gearbox 20. The gearbox and motor may be of a generally well-known type and do not, per se, constitute the invention. The motor may, for example, comprise a hydraulic motor as shown, or it may alternatively comprise an electric motor. The gearbox is of the driven-housing type, for example, a "Flangeless FW6" type gearbox of the Fairfield Manufacturing Co., in which the gearbox housing 22 rotates to drive drum 10 in a manner to be described. A conventional drive connection (not shown) is provided between the motor and an input shaft of the gearbox.

The gearbox housing 22 is rim-mounted to the interior of drum 10 by a split-ring-like mounting flange structure comprising respective half-rings 24, 26, each having an outer diameter substantially conforming to the diameter of wall 14. The half-rings 24, 26 are releasably secured to a surface of the gearbox housing facing opening 16 by a first set of circumferentially spaced axially extending screws 28, inserted through suitable apertures in the half-rings and tapped holes in the gearbox housing. Further, the half-rings are releasably secured to the inner wall 14 of the drum by a second set of circumferentially spaced radial fastener screws 30 extending through countersunk radial apertures 32 in the drum into tapped radial holes 34 in the half-rings (see FIG. 3) between screws 28. It will be noted that half-rings 24, 26 are secured to the end of gearbox 20 which faces the access opening 16, with screws 28 being accessible from the access opening. It is also evident that gearbox housing 22 may have a diameter approaching that of wall 14.

Motor 18 is supported adjacent gearbox 20 on a motor mounting flange 36 having an outer diameter similar to that of the gearbox, the motor being attached to the flange 36 in known manner, for example, by fasteners 38. Flange 36 is itself supported by a reactor tube 40 of comparable outer diameter which may, for example, have an internal end flange 42 whereby the tube is releasably connected to flange 36 by further fastener screws 44. Tube 40 extends out of the drum 10 through opening 16, and is attached adjacent the end of the drum to a stationary anchor plate 46 or the like. As best shown in FIG. 2, the motor mounting flange has an outer periphery 48 with a notch 50 which can be aligned with the respective screws 28 (to obtain access to the screws) by suitable rotation of drum 10 when tube 40 is detached. When the tube is attached, the notch is effectively covered by flange 42. While only one notch 50 is necessary, flange 36 could be provided with two or more such notches, spaced around the periphery.

In assembly of the drive mechanism, gearbox 20 is loosely attached to the respective half-rings 24, 26 by screws 28. The gearbox with attached half-rings is then inserted into the drum from the access end, and positioned to align the radial holes 34 in the half-rings with the drum apertures 32. The screws 30 are then inserted and tightened to secure the half-rings to the wall of the drum. The gearbox mounting screws 28 can then be tightened up to secure the gearbox, with access to the screws being obtained through the notch 50 in the motor mounting flange as described. The reactor tube 40 is then attached and secured to anchor plate 42. Dismantling of the drive system may readily be effected by reversing the procedure.

As previously indicated, the above-described mounting arrangement of the gearbox using a split-ring-type flange may tend to cause bending stresses in the drum to be transmitted to the gearbox bearings. Modified systems in accordance with the invention, which substantially prevent this occurrence, are illustrated in FIGS. 4 to 6.

Thus, as shown in FIGS. 4 and 5, the half rings 24, 26 of the previous embodiment may be replaced by an integral peripheral flange 52 formed directly on the gearbox 20', and in this case the gearbox is secured in the drum by circumferentially spaced radial socket-head screws 54 which extend through oversize apertures 56 formed through the drum 10', the apertures allowing a degree of relative movement between the gearbox and drum, at least in a circumferential torque-applying direction. The remainder of the drum drive mechanism may be substantially as described with relation to the previous embodiment. In the modified arrangement, the internal surface 58 of the drum should be machined, at least from the access end to just beyond apertures 56, so as to conform accurately with the outside diameter of flange 52. As an alternative to the integral peripheral flange 52, there may be provided a one-piece 360° mounting ring 60 (FIG. 6) which is again secured to the drum by socket-head screws 54' in oversize apertures 56', and which is secured to gearbox 20 by screws 62 corresponding to the screws 28 of the first embodiment. The internal surface 58' of the drum should again be machined to conform with the outside diameter of ring 60.

In the modified arrangements, shown in FIGS. 4 to 6, there are substantially no radial forces applied to the gearbox housing from the radially oriented screws, and the drive mechanism is somewhat simpler to install than that of the first embodiment.

The apparatus thus far described has related exclusively to a drive mechanism at one end of a driving or winding drum, or the like. It will be readily apparent that, if required, any one of the described assemblies may be duplicated at the other end of the drum. However, where duplicate drive motors are not required, a simplified bearing assembly as shown in FIG. 7 may be used. The bearing assembly is similar in character to the previously described drive systems but utilizes a dummy gearbox 70 in place of gearbox 20 or 20' of the drive system. The dummy gearbox is of similar overall configuration to gearbox 20 or 20' with a rotary housing and shaft bearings, but no gears and dummy gearboxes of this nature are known per se. The dummy gearbox may be rim mounted in the drum and secured thereto by any of the previously described radial screw-embodying flange arrangements. Thus, FIG. 7 shows a one-piece mounting ring 72, similar to ring 60 in FIG. 6, and which is secured to the drum by radial socket head screws 74 in oversize openings and to the dummy gearbox by screws 76. The shaft of the dummy gearbox may be supported in suitable manner in a mounting bracket 78 attached to flange 80 of a tube 82 (corresponding to reactor tube 40 in FIG. 1) and the tube 82 may again be secured to an anchor plate 84 outside of the drum as in FIG. 1, so that the dummy gearbox is effectively rotatable about its shaft which is supported cantileverwise by tube 82.

It is evident that the mounting of the gearbox inside of the drum using the above-described system provides an extremely effective, substantially stress-free firm drive connection between the gearbox and drum, while facilitating assembly and dismantling of the drive mechanism in a drum of minimum diameter. The apparatus herein described accordingly provides an internally mounted rotary drum drive arrangement which is well adapted to fulfilling the objects of the invention.

While only preferred embodiments of the invention have been described herein in detail, the invention is not limited thereby and modifications can be made within the scope of the attached claims.

What is claimed is:

1. An internally mountable drive mechanism for a rotary drum having an internal cylindrical cavity for accommodating the drive mechanism, said cavity having a peripheral wall and an access opening at one end of the drum, the drive mechanism including a gearbox having a housing adapted to fit the cavity, ring-like mounting flange means on the gearbox housing having an outside diameter substantially conforming to the diameter of said wall, fastener means for releasably attaching the flange means to the wall of the cavity in predetermined axial position, the fastener means comprising circumferentially spaced fasteners extending radially into the flange means through oversize apertures in the drum, a motor for driving the gearbox in a manner to rotate the gearbox housing and thereby apply torque to the drum through said mounting flange means, and a motor mounting assembly for mounting the motor in driving position in the cavity adjacent an end of the gearbox facing said access opening and for supporting the motor from an anchor means externally of the drum adjacent said one end thereof.

2. The invention as defined in claim 1 wherein the mounting flange means comprises a ring-like flange, and the mechanism includes further fastener means for releasably securing the flange to a surface of the gearbox housing facing said opening.

3. The invention as defined in claim 1 wherein the mounting flange means comprises a peripheral flange integrally formed on the gearbox housing.

4. The invention as defined in claim 1 wherein the peripheral wall of the cavity is machined from said opening at least to a location immediately beyond said apertures, so as to conform accurately with the outside diameter of said mounting flange means.

5. The invention as defined in claim 1 wherein the fasteners are socket-head screws.

6. An internally mountable drive mechanism for a rotary drum having an internal cylindrical cavity for accommodating the drive mechanism, said cavity having a peripheral wall and an access opening at one end of the drum, the drive mechanism including a gearbox having a housing adapted to fit the cavity, ring-like mounting flange means on the gearbox housing having an outside diameter substantially conforming to the diameter of said wall, fastener means for releasably attaching the flange means to the wall of the cavity in predetermined axial position, the fastener means comprising circumferentially spaced fasteners extending radially into the flange means through oversize apertures in the drum, a motor for driving the gearbox in a manner to rotate the gearbox housing and thereby apply torque to the drum through said mounting flange means, and a motor mounting assembly for mounting the motor in driving position in the cavity adjacent an end of the gearbox facing said access opening and for supporting the motor from an anchor means externally of the drum adjacent said one end thereof, wherein the motor mounting assembly comprises a motor mounting flange for locating the motor adjacent said end of the gearbox, attachment means between the motor and said flange, a reactor tube, second fastener means for releasably securing an inner end of the reactor tube to the motor mounting flange, and further attachment means between an outer end of the reactor tube and said anchor means.

7. The invention as defined in claim 6 wherein the mounting flange means comprises a ring-like flange with circumferentially spaced axially extending screws connected between the gearbox housing and the ring-like flange, wherein the motor mounting flange has an outer diameter at least equal to the diameter of a circle on which said screws are located, and wherein the motor mounting flange has a periphery with at least one notch to be aligned with the respective screws for obtaining access to the screws from said access opening.

8. The invention as defined in claim 7 wherein the inner end of the reactor tube has an inwardly directed flange covering said notch and wherein the second fastener means is connected between said inwardly directed flange and the motor mounting flange.

9. The invention as defined in claim 8 wherein the gearbox housing, the motor mounting flange, and the reactor tube are all of comparable outer diameter having minimum clearance with the cavity wall.

10. A rotary belt-winding, belt-driving or like drum having an internal cavity with a peripheral wall, a first access opening at one end of the drum, a further access opening at the other end of the drum, a drive mechanism within the cavity for rotating the drum, the drive mechanism comprising a motor and gearbox assembly, the gearbox having a housing adapted to be rotated by the motor for applying torque to the drum, mounting flange means on the gearbox housing, first releasable fastener means extending radially through the drum securing the mounting flange means to the drum, a motor mounting flange adjacent one end of the gearbox housing facing the first access opening, the flange locating the motor in a gearbox driving position, a first reactor tube supporting the motor mounting flange, the reactor tube extending out of the drum through the first access opening for attachment to a first anchor means adjacent said one end of the drum, a bearing assembly for the other end of the drum, the bearing assembly including a dummy gearbox within said cavity, the dummy gearbox having a housing, a shaft and bearings between the housing and shaft, further mounting flange means on the housing of the dummy gearbox, further releasable fastener means extending radially through the drum securing the further mounting flange means to the drum, mounting bracket means in the cavity for the shaft of the dummy gearbox, a further reactor tube extending into the cavity from said second access opening for supporting the mounting bracket means, and second anchor means outside the other end of the drum for supporting the further reactor tube.

11. The invention as defined in claim 10 wherein at least the first releasable fastener means comprises circumferentially spaced fasteners extending through oversize apertures in the drum.

12. The invention as defined in claim 10 wherein at least the mounting flange means comprises a plurality of individual part-circular ring segments and fasteners securing said segments to a surface of the gearbox facing the first access opening.

13. A rotary belt-winding, belt driving or like drum having an internal cavity with a peripheral wall, a first access opening at one end of the drum, a further access opening at the other end of the drum, a first drive mechanism within the cavity adjacent the one end of the drum, and a second drive mechanism within the Cavity adjacent the other end of the drum, each drive mechanism comprising a motor and gearbox assembly, the gearbox having a housing adapted to be rotated by the motor for applying torque to the drum, mounting flange means on the gearbox housing, first releasable fastener means extending radially through the drum securing the mounting flange means to the drum, a motor mounting flange adjacent one end of the gearbox housing facing the respective access opening, the flange locating the motor in a gearbox driving position, and a reactor tube supporting the motor mounting flange, the reactor tube extending out of the drum through the respective access opening for attachment to anchor means adjacent the respective end of the drum.

14. The invention as defined in claim 13 wherein the first releasable fastener means comprises circumferentially spaced fasteners extending through oversize apertures in the drum.

15. The invention as defined in claim 13 wherein the mounting flange means comprises a plurality of individual particular ring segments and fasteners securing said segments to a surface of the gearbox facing the respective access opening.

* * * * *